US008370235B1

(12) United States Patent  
Chase et al.

(10) Patent No.: US 8,370,235 B1  
(45) Date of Patent: Feb. 5, 2013

(54) FACILITATING SUBMISSION AND PROCESSING OF REQUESTS TO PERFORM SERVICES ON REAL PROPERTY

(75) Inventors: Lydia Chase, Dallas, TX (US); Doug Bland, Frisco, TX (US); Lisa Barrentine, Allen, TX (US)

(73) Assignee: Hometracker, L.P., Addison, TX (US)

( * ) Notice: Subject to any disclaimer, the term of this patent is extended or adjusted under 35 U.S.C. 154(b) by 385 days.

(21) Appl. No.: 12/561,417

(22) Filed: Sep. 17, 2009

Related U.S. Application Data

(62) Division of application No. 10/815,550, filed on Apr. 1, 2004, now Pat. No. 7,983,968.

(51) Int. Cl.  
*G06Q 10/00* (2012.01)

(52) U.S. Cl. .................. 705/35; 705/300; 705/314

(58) Field of Classification Search ............ 705/35, 705/38, 300–301, 305, 307, 313–315; 707/705, 707/790–793  
See application file for complete search history.

(56) References Cited

U.S. PATENT DOCUMENTS

| | | | |
|---|---|---|---|
| 5,696,907 A | 12/1997 | Tom | |
| 7,321,864 B1* | 1/2008 | Gendler | 705/7 |
| 7,499,890 B1 | 3/2009 | Allen | |
| 2001/0034675 A1 | 10/2001 | Belford et al. | |
| 2002/0040313 A1* | 4/2002 | Hunter et al. | 705/9 |
| 2003/0144949 A1 | 7/2003 | Blanch | |
| 2003/0177070 A1 | 9/2003 | Viswanath et al. | |
| 2005/0049903 A1 | 3/2005 | Raja | |
| 2005/0144125 A1 | 6/2005 | Erbey et al. | |
| 2007/0150319 A1 | 6/2007 | Menendez | |
| 2007/0179790 A1 | 8/2007 | Leitch et al. | |

OTHER PUBLICATIONS

Ad, *The USFN Report*, 2 pages, Winter 2004.
HomeTracker Lender Center, *Workflow Training Manual*, Version 2.0, 32 pages, Apr. 13, 2004.
McSnow, Mortgage Contracting Services, Website www.mcsnow.com, *Automated Over-Allowable System*, 3 pages (obtained from archive.org), May 29, 2003.
U.S. Appl. No. 10/815,550 entitled, "Facilitating Submission and Processing of Requests to Perform Services on Real Property," filed Apr. 1, 2004, 31 pages.
U.S. Appl. No. 12/561,574 entitled, "Facilitating Submission and Processing of Requests to Perform Services on Real Property," filed Sep. 17, 2009, 35 pages.
Ad, *The USFN Report*, Winter 2004, 2 pages.
"HomeTracker Lender Center Workflow Training Manual," Version 2.0, *HomeTracker, LP*, Run date: Apr. 13, 2004, 32 pages.
"Automated Over-Allowable System," McSnow, *Mortgage Contracting Services, Inc.*, May 29, 2003 (Obtained from archive.org), 3 pages.

(Continued)

*Primary Examiner* — Mary Cheung  
(74) *Attorney, Agent, or Firm* — Baker Botts L.L.P.

(57) ABSTRACT

Systems and techniques for submitting requests for approval relating to management of real property include presenting, on a user interface, a form for receiving data from a first user. An indication of one or more requests to be approved is received as a result of a user interaction with the form. For each request, types of data items to be provided by the first user are identified. The types of data items identified for each service are based on a type associated with the request. An indication of the identified types of data items for each request is displayed on the form. After a submission of the form, an approval of at least one, but fewer than all, of the requests can be received from a second user. In response, the first user can be notified of the approval and of requests not approved.

9 Claims, 5 Drawing Sheets

OTHER PUBLICATIONS

"HomeTracker Lender Center Lender Center Training Update for Countrywide," Version 2.0, *HomeTracker, LP*, Run date Jan. 26, 2009, 7 pages.

U.S. Patent and Trademark Office Official Action in U.S. Appl. No. 10/815,550, dated May 7, 2008, 9 pages, May 7, 2008.

U.S. Patent and Trademark Office Official Action in U.S. Appl. No. 10/815,550, dated Nov. 26, 2008, 10 pages.

U.S. Patent and Trademark Office Official Action in U.S. Appl. No. 10/815,550, dated May 29, 2009, 11 pages.

U.S. Patent and Trademark Office Official Action in U.S. Appl. No. 10/815,550, dated Dec. 7, 2009, 12 pages.

U.S. Patent and Trademark Office Official Action in U.S. Appl. No. 10/815,550, dated Oct. 6, 2010, 12 pages.

U.S. Patent and Trademark office Official Action in U.S. Appl. No. 12/561,574, dated Jan. 10, 2011, 8 pages.

* cited by examiner

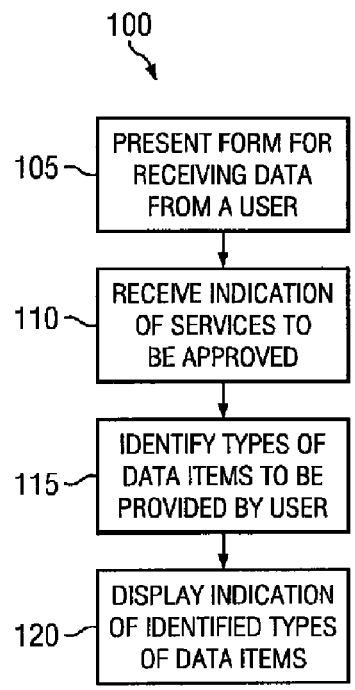
FIG. 1
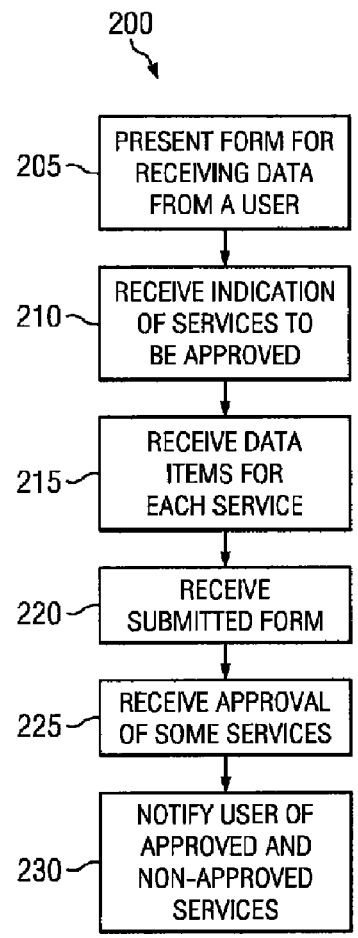
FIG. 2
FIG. 3C

Add more lines

Incurred
Preservation and Protection Costs Expended to Date (excluding inspections):
(Note: Expenses must be consistent with HUD P&P limits and/or guidance and are subject to further verification.)

| SERVICE APPROVED FROM PRIOR P&P | QUANTITY | DIMENSIONS | | COMMENTS | COST |
|---|---|---|---|---|---|
| Debris-Hazards | 12 | | x | paint/oil/etc | 120.00 |
| Debris-Hazards | 7 | | x | tires | 70.00 |
| Lawn-Initial Maintenance | 1 | 80 | x 100 | 1-3 ft | 125.00 |
| Lawn-Shrubs | 5 | | x | trim 3 tall trees/ 2 bushes | 750.00 |
| lock | | | x | | 43.75 |
| padlock | | | x | | 37.50 |
| wint | | | x | | 120.00 |

↙ 340

| SERVICE | COMMENTS | COST |
|---|---|---|
| | | |
| | | |
| | | |
| | | |

↙ 345

(2) Expended Total: $1,266.25
(4) Total Authorization Not To Exceed [(2) + (3)]: $1,266.25

Comments

FIG. 4

| P&P Request | History | | | | | | | | | |
|---|---|---|---|---|---|---|---|---|---|---|
| Save | Cancel | New | | 📄 Search: Loan # | | | Case # | | | Go |
| Created Date 03/25/2004 | | Requested Date | | 021-9214550 \| Loan#:4675071 \| 11585 WEST MONTE VISTA ROAD | | | | | | |
| High Priority ☐ | | Submit for Review ☐ | | Vacant: 01/13/2004 Days:72 \| AVONDALE, AZ 85323 | | | | | | |
| | | | | Foreclosure Deed/Trust Sale Date 03/03/2004 | | | | | | |

Requested
Permission is requested to perform the following services (all applicable estimates and required documentation are attached and/or faxed as noted.)

| | SERVICE | BID | QUANTITY | DIMENSIONS | | COMMENTS | AMOUNT | APPROVED? | APPROVED COST |
|---|---|---|---|---|---|---|---|---|---|
| 1. | Debris-Exterior ▸ | 1 ▲ | | X | | ◂▸ | | ▸ | |
| | 305 — 405 — | 2 | | X | | ◂▸ | | | |
| 2. | Damage Repair-Plumbing ▸ | 1 | | X | ▲ | ◂▸ | | ▸ | |
| | Damage Repair-Plumbing ◂▸ | 2 | | X | | ◂▸ | | | |
| | Damage Repair-Vandalism | | | | | | | | |
| | Damage Repair-Water 410 | | | | | | | | |
| 3. | Debris-Exterior | 1 | | X | ▲ | ◂▸ | | ▸ | |
| | Debris-Hazards | 2 | | X | | ◂▸ | | | |
| | Debris-Interior | | | | | | | | |
| 4. | Debris-Personal Property/Store | 1 ▲ | | X | ▲ | ◂▸ | | ▸ | |
| | Doors-Board | 2 | | X | | ◂▸ | | | |
| | Doors-Brace | | | | | | | | |
| 5. | Doors-Repair | 1 ▲ | | X | | ◂▸ | | ▸ | |
| | Doors-Replace | 2 | | X | | ◂▸ | | | |
| 6. | Lawn-Initial Maintenance ▸ | 1 ▲ | | X | ▲ | ◂▸ | | ▸ | |
| | | 2 | | X | | ◂▸ | | | |
| 7. | Windows-Brace/Lock ▸ | 1 ▲ | | X | | ◂▸ | | ▸ | |
| | | 2 | | X | | ◂▸ | | | |
| 8. | ▸ | 1 ▲ | | X | | ◂▸ | | | |
| | | 2 | | X | | ◂▸ | | | |

| P&P Request | ☐ History Print | | | | |
|---|---|---|---|---|---|
| | | | Save Cancel | Search: Loan # ☐ Case # ☐ | |
| Created Date | 04/29/2003 | Requested Date | 04/29/2003 | Foreclosure Deed/Trust Sale Date | |
| High Priority | ☐ | Submit for Review ☑ | New | | |
| | | | Resubmit Request 535 | | |

Requested
Permission is requested to perform the following services (all applicable estimates and required documentation are attached and/or faxed as noted.)

| | SERVICE | BID | QUANTITY | DIMENSIONS | COMMENTS | AMOUNT | APPROVED? | APPROVED COST |
|---|---|---|---|---|---|---|---|---|
| 1. | Lawn-Initial Maintenance ▾ | 1 | 80 | x 200 | | 240.00 | Yes ▾ | 240.00 |
| 2. | Lawn-Re-cuts ▾ | 1 | 80 | x 200 | 6"-3" | 80.00 | No ▾ | |

510 → 515 → 505

[Add more lines]

(1) Bid 1 Pending Total: $320.00
(2) Bid 2 Pending Total: $0
(3) Total Additional Expenditures Approved Not to Exceed: $240.00

Incurred
Preservation and Protection Costs Expended to Date (excluding inspections):
(Note: Expenses must be consistent with HUD P&P limits and/or guidance and are subject to further verification.)
(2) Expended Total: $0
(4) Total Authorization Not To Exceed [(2) + (3)]: $240.00

Comments [                    ] ← 525

HUD Approval/Disapproval

Approved Yes ▾ Response Date 04/30/2003 Approval Date 04/30/2003 Approved By: Adam Murphy Denial Reason: [                    ]

Response Comments [recut not needed if conveying on time] ← 530

← 500
← 520

FACILITATING SUBMISSION AND PROCESSING OF REQUESTS TO PERFORM SERVICES ON REAL PROPERTY

CROSS-REFERENCE TO RELATED APPLICATION

This application is a divisional application of U.S. application Ser. No. 10/815,550, filed Apr. 1, 2004 and entitled "Facilitating Submission and Processing of Requests to Perform Services on Real Property."

TECHNICAL FIELD

This description relates to real estate asset management, and more particularly to facilitating communications between an owner of real estate assets and an entity that manages the preservation and protection of the assets.

BACKGROUND

Owners of real estate assets frequently contract with other entities to manage the real estate and/or to provide upkeep, maintenance, security, and other preservation and protection services. The entities that manage real estate often need to communicate with the owners of the real estate to obtain approvals for services to be performed. Such communications may occur, for example, between a real estate management company and an owner of real estate assets, between a preservation and protection company and a lending institution that owns real estate assets through foreclosures, or between a lending institution and a marketing and management contractor that works on behalf of the U.S. Department of Housing and Urban Development (HUD).

The general preservation and protection scenario is illustrated by the procedures and programs implemented by HUD. HUD and the Federal Housing Administration (FHA), which is a part of HUD, provide a mortgage insurance program through which lenders can obtain protection against losses as the result of homeowners defaulting on their mortgage loans. Through this program, FHA-approved lenders can offer FHA-insured loans to homeowners that meet certain qualifications. The mortgage process for an FHA-insured loan generally proceeds in the same manner as an ordinary home loan, except that the lender bears less risk because. FHA will pay a claim to the lender in the event of a homeowner's default. In the event a default occurs, ownership of the home reverts to HUD once the lender has performed the necessary, foreclosure or trust sale procedures.

The lender, however, has certain duties in connection with the foreclosure or trust sale. For example, the lender is required to avoid undue delay in initiating the foreclosure process, to convey the property to HUD within a certain period after foreclosure, to protect and preserve the condition of the property prior to conveyance, to ensure clear title to the property within a certain period after conveyance, and to submit claims for reimbursement of expenses within a certain period after conveyance.

In protecting and preserving the property, certain expenditures are pre-approved for reimbursement. Thus, HUD will reimburse the lender for certain pre-approved preservation and protection (P&P) expenditures. In many cases, however, there is a need for repairs and/or maintenance that is not pre-approved or that is in excess of the pre-approved expenditure limits. In such a case, the lender must obtain approval to perform additional work. Without such approval, HUD will not reimburse expenses in excess of the applicable limits. In addition, the lender can be charged interest if it does not perform tasks within the specified time frames. If circumstances prevent the lender from complying with the time limitations, the lender can avoid interest charges if it obtains an extension.

Lenders obtain approvals for over-allowable expenditures and extensions from marketing and management (M&M) contractors, who contract with HUD to market and manage HUD's property inventory. The process of obtaining approvals can be time-consuming and, unless the process runs smoothly, can prevent lenders from complying with the time limitations imposed by HUD, especially if the applicable over-allowable request forms or extension request fauns are not properly completed (e.g., because of the delay caused by the lender submitting the request, the M&M contractor identifying and informing the lender of the error or omission, and the lender rectifying the error or omission). The submission and processing of these request forms has been improved through the use of web services that allow the lender to electronically submit the request forms and that facilitate communications between the lender and the M&M contractor. Although the use of web services somewhat streamlines the approval process, problems can still arise that cause delays in obtaining approval.

SUMMARY OF THE DISCLOSURE

The invention described in this specification provides techniques and systems for improving the provision of web services and/or other applications for submitting and processing requests relating to rehabilitating and conveying real property. The described techniques and systems can be used, in particular, in connection with submitting and processing over-allowable request forms and extension request forms for properties that are to be conveyed to HUD, other governmental entities, or other entities or individuals that acquire significant numbers of houses or other real property. The inventors of the described subject matter recognized that existing web services could be improved by adding features that further streamline the approval process and that make the web services easier to use.

In one general aspect, requests for approval relating to management of real property are submitted by presenting, on a user interface, a form for receiving data from a user. The data relates to one or more requests that further relates to management of real property. An indication of one or more requests is received through a user interaction with the form presented on the user interface. For each request, one or more types of data items to be provided by the user are identified. The types of data items identified for each request are based on a type associated with the request. An indication of the types of data items for each request is displayed on the form.

Implementations can include one or more of the following features. Each request for approval can be a request for approval to perform a service and the type associated with the request can be an identity associated with the service. Alternatively, each request can be a request for an extension to a deadline. The user interaction with the form presented on the user interface can involve a user selection of services from a menu of possible services. The menu can be a pull-down menu, and the menu of available services can be customized in accordance with the requirements of an owner of the real property. For purposes of this description, the owner of the real property can include entities that work on behalf of the actual owner.

The services can relate to preservation and protection of the real property, and the preservation and protection of the real property relate to a conveyance of the real property to a receiving entity different from a managing entity that manages the preservation and protection. The approval relates to a reimbursement of costs associated with the services, and the reimbursement is provided by the receiving entity to the managing entity. The types of data items are selected from a predefined set of data item types identified on the form. The form includes, for each service, a data entry field for each type of data item in the predefined set of data item types, and the indication of the types of data items for each service includes an indication of the data entry fields to be completed by the user. The predefined set of data item types includes a quantity, a size, an explanation, and/or a cost. The predefined set of data items can be customized in accordance with requirements of an owner of the real property. In cases where the request is a request for an extension to a deadline, the predefined set of data item types can include a date and/or an explanation. The indication of the types of data items includes an indication that the user is to provide a specified number of bids for the service, although a submission of the form with less than the specified number of bids for the service is allowed. Subsequently, the user is allowed to retrieve the form and provide one or more additional bids.

After the data items are entered, the data items are received, and each request and the corresponding data items received from the user are compared to data that relates to approval guidelines. Based on the comparison, a determination of whether the request should be approved can be made automatically.

After the data items are entered, a submission of the form is received, and an approval of at least one, but fewer than all, of the plurality of requests is received. An indication of the approval and an indication of requests not approved are then presented to the first user. In response, the first user can modify the data items for the requests not approved and resubmit the form with the modified data items. The first user can resubmit the form using a user interface component for resubmitting the request. The data in the form can be used to automatically complete a form to be printed, and the form to be printed can be formatted according to a format specified by a governmental agency or by an owner of real estate assets.

The invention can be implemented as a method, in a system, or as a machine-readable medium storing instructions for causing one or more processors to perform the described operations.

The details of one or more implementations are set forth in the accompanying drawings and the description below. Other features will be apparent from the description and drawings, and from the claims.

BRIEF DESCRIPTION OF THE DRAWINGS

FIG. 1 is a flow diagram of a process for submitting requests for approval to perform services on real property, for approval of an extension to a deadline, or for other approvals relating to management of real property.

FIG. 2 is a flow diagram of another process for submitting requests for approval to perform services on real property.

FIGS. 3A-3C depict an example of a form, which can be displayed on a user interface, for a user to enter requests for approval to perform services on real property.

FIG. 4 depicts another example of a form, which can be displayed on a user interface, for a user to enter requests for approval to perform services on real property.

FIG. 5 depicts an example of a form, which can be displayed on a user interface, for displaying a response to requests for approval to perform services on real property.

Like reference symbols in the various drawings indicate like elements.

DETAILED DESCRIPTION OF THE DRAWINGS

FIG. 1 is a flow diagram of a process 100 for submitting requests for approval to perform services on real property, for approval of an extension to a deadline, or for other approvals relating to management of real property. A user interface is used to present a form for receiving data from a user (step 105). The form is adapted to solicit and receive particular types of data relating to a request for approval to perform services on real property and/or a request for an extension relating to the real property (e.g., a request for an extension of a deadline to convey the property, to perform a service, etc.). For example, the form is adapted to receive data needed for an over-allowable request for P&P services or for an extension in connection with P&P services. The user can be an individual or can be one or more persons in an administrative role within an enterprise, in which case different individuals may interact with the user interface through different client workstations and/or at different times. The following discussion primarily focuses on the use of the process 100 in requesting approval for services to be performed. The invention can also be used in connection with extension requests and/or other requests for approval.

An indication of one or more services to be performed is received through a user interaction with the form (step 110). Typically, the user identifies the services for which approval for over-allowable expenditures is requested. In some implementations, the user can select services from a pull-down or pop-up menu. The menu can include a predefined list of possible services (e.g., clean appliances; cap gas or water lines; repair fire, water, freeze, or other damage; clear debris; perform lawn care; treat mold; replace roof; board windows) and can include an "other" category for entering or indicating services not included in the predefined list. The predefined list of possible services can be customized in accordance with the needs or requirements of the particular owner of the real property, including requirements imposed by an entity that acts on behalf of the owner. In other implementations, the user can enter a textual description of the service in a data entry field. In an implementation that supports the ability to request extensions, the user identifies a type of extension. The identification can be made by selecting from a predefined menu of extension types.

For each service or other request, one or more types of data items to be provided by the user are identified on the user interface (step 115). The data item types that are identified for each service are based on the identity of the service. In general, the types of data items to be provided by the user correspond to the data needed to assess whether the service is necessary and whether the associated cost is reasonable or warranted. The types of data items can include bids for the services, quantities relating to the services, sizes relating to the services, explanations of the services, costs for the services, or other categories of data associated with the services. In an implementation that supports the ability to request extensions, the data item types that are identified for the requested extension are based on the type of extension. The types of data items may include dates (e.g., an updated vacancy date, a new foreclosure date, etc.) and explanations of the reasons for the request.

For each service or other request, an indication of the identified types of data items is displayed on the form (step 120). The types of data items to be provided can be identified by highlighting or otherwise distinguishing data entry fields, pull-down menus, or buttons associated with the particular types of data items to be provided. For example, if one of the identified services is to perform lawn care, indications that the user needs to provide dimension data (i.e., for the yard) and comments (i.e., on the height of the grass) are presented on the user interface. If another of the identified services is to clear hazardous debris, indications that the user needs to provide quantity data (i.e., a number of cubic yards), comments (i.e., a general description of the hazardous debris), and two bids (i.e., from contractors who would perform the work) are presented on the user interface. The types of data items to be provided are not limited to the examples described but can be customized in accordance with the needs or requirements of the particular owner of the real property, including requirements imposed by an entity that acts on behalf of the owner.

The form can include one or more data entry fields or pull-down menus for each data item type in a predefined set of data item types (e.g., dimension, quantity, comments, and bids). Thus, for each service, the form can include data entry fields for all of the data item types in the predefined set, even if one or more of the data entry fields are not required to be filled in by the user for a particular service. For example, the form may include a "quantity" data entry field for a "perform lawn care" service, even if it is not necessary to enter data in the "quantity" field for the "perform lawn care" service. Instead, the form can include a pointer or highlighting for indicating that the user only needs to enter data in the "dimensions" and "comments" data entry fields. In other implementations, the types of data items to be provided by the user can be indicated by only providing data entry fields on the form for the types of data items to be provided. For example, when an indication of the "perform lawn care" service is received from the user, data entry fields for "dimensions" and "comments" can be displayed on the form, while data entry fields for a "quantity" and a second bid are omitted.

Typically, a user is not permitted to submit a form without providing data for all of the types of data items to be provided by the user. For example, if data is required to be entered in a "quantity" data entry field for a particular service, the user is not permitted to submit the form until the user has entered data into the "quantity" field. For example, the user can be prevented from submitting the form by "graying-out" a "submit" button, link, or checkbox on the form or by displaying an error message in response to an attempt to submit the form prior to completing all of the required fields.

In some implementations, however, the user can submit a form without providing data for all of the required number of bids. For example, if two or more bids are required for a particular service, the user is permitted to submit the form with only one bid. Although the request described in the submitted form will not be approved, at least for the particular service that requires two or more bids, processing of the form/request can be accelerated by allowing the form to be submitted without required additional bids because the form includes all of the information necessary to assess whether the service is likely to be approved; the only issue that remains is the cost. Moreover, in some cases, an approval may be granted without a second bid, if the first bid is considered to be fair and/or adequate. The user also may not realize that a second bid is required until after he or she has assembled essentially all of the required information for the over-allowable request except for a second bid. The user can submit the form without the second bid and can subsequently retrieve the form and provide an additional bid once the bid is received. Again, allowing an earlier submission can help accelerate the approval process.

In general, the process 100 can be used in connection with services relating to the preservation and protection of real property and in connection with a conveyance of the real property from an entity that manages the preservation and protection (e.g., a lender that finances an FHA loan on the real property) to a different entity (e.g., HUD). The process 100 can be used to obtain approval for costs or expenditures on the services, which, if approved, are reimbursed from the receiving entity to the entity that manages the preservation and protection. Thus, the process 100 can be used to substantially automate the preparation, submission, and processing of over-allowable forms to M&M contractors. In some implementations, approval of requests can be automated or partially automated based on the identified services, the data items received from the requesting user, other information associated with the real property, and tables or other information stored in a database associated with an entity that is responsible for approving requests. For example, such a database can store cost tables that provide maximum or pre-approved costs associated with particular geographic regions, particular services, and data (e.g., dimensions, quantities, explanations, etc.) relating to the extent of the services. Such a database can also store extension data that indicates when extensions can be granted based on information (e.g., completion dates of other activities) provided by the requesting user. HUD sometimes provides guidance to M&M contractors on what costs the M&M contractor is allowed to approve. Such information can be incorporated into a system that cross-references the cost guidance against information provided by a requesting user to automatically determine if approval is warranted. For instance, if a lender has a property in Texas and wants to request approval to perform debris removal services for a specified bid amount, the data items (e.g., a quantity and description) associated with the requested service can be used to automatically determine if the bid amount falls within the cost guidelines. This automatic determination can be used to automatically notify the requesting user of an approval or rejection or can be used to display a recommendation to a user that is ultimately responsible for approving or rejecting the request.

In some implementations, digital signatures can be used by the lender to authenticate a submission and by the M&M contractor to authenticate an approval. Implementations can also support printing of the forms in a format specified by a government agency (e.g., HUD) or by another entity (e.g., the owner of the real property). Thus, the information entered on the form through the user interface can be inserted into a form that can be printed.

FIG. 2 is a flow diagram of another process 200 for submitting requests for approval to perforin services on real property. The process 200 can be used separately or in conjunction with the process 100 depicted in FIG. 1. A user interface is used to present a form for receiving data from a user (step 205). The form is adapted to solicit and receive particular types of data relating to a request for approval to perform services on real property. An indication of multiple services to be performed is received through a user interaction with the form (step 210).

For each service, one or more data items are received from the user through the user interface (step 215). The data items can relate to one or more bids for the services, a quantity associated with the service (e.g., a quantity of objects to be affected by the services), sizes associated with the services (e.g., dimensions of the objects to be affected by the services), explanations of the services, costs for the services, or other data associated with the services. A submission of the form is received from the user through the user interface (step 220).

For example, once the user has completed the form, the user can submit the form by adding a digital signature and/or select a button, link, or checkbox displayed on the user interface using a mouse or other pointing device. The form can be transmitted from a client device over a network to a host. The host can then notify a reviewing user (e.g., an M&M contractor) having administrative rights to approve the request contained on the form of the submission. The reviewing user can access the submitted form on another client device.

An approval of one or more of the services, but fewer than all of the services, is received from the reviewing user (step 225). The approval can be received as a submission from the reviewing user that is transmitted from the client device associated with the reviewing user to the host. The approval of only some of the requested services may be based on insufficient information in the original request, an unreasonable bid amount, or a determination that the requested services are unnecessary or are not reimbursable because the need for the services was caused by the requesting entity's own neglect. The requesting user is then notified of the approval of some services and that others of the requested were not approved (step 230). The notification can be in the form of an electronic mail message and/or can be noted on a web page associated with the host and accessed from a client device. The notification can include an indication of the reasons that certain services were not approved. In some cases, approval of all or none of the requested services may also be received, in which case the requesting user is notified of the outcome.

The user can then access the form through a user interface. The form can be in generally the same format as the form that was originally submitted but can include some indication of the services that have been approved. The user can modify one or more of the data items for the non-approved services. The modifications, for instance, can be designed to overcome the reasons that the services were not approved, such as by providing a more detailed description or a description in a different format (e.g., using different units to describe the dimensions). The user can then resubmit the form with the modified data items by selecting a "submit" or "resubmit" button, link, or checkbox. Thus, the process 200 allows for a partial approval (i.e., line item approval) of a request. This prevents a request from being rejected based on isolated problems with the request and facilitates a convenient way to rectify any such problems and to resubmit the request. Although FIG. 2 is discussed in connection with requests for approval of services, the process 200 can also be used in connection with requests for approval of extensions to deadlines (i.e., to receive requests for approval of multiple extensions, to receive data items associated with each requested extension, and to notify the requesting user of approvals and rejections).

Figure 3A:
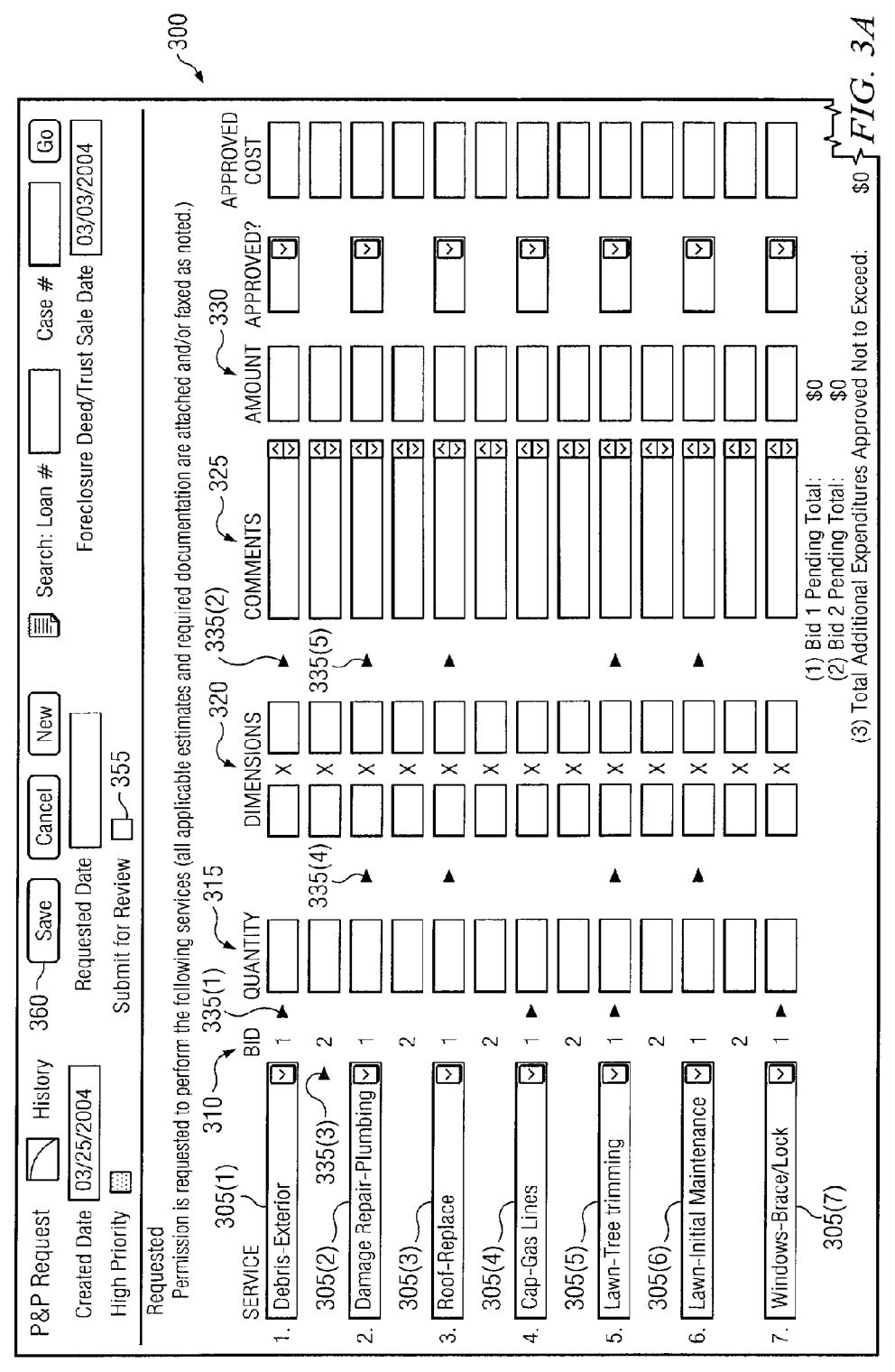

FIGS. 3A-3C and 4 depict an example of a form 300, which can be displayed on a user interface, for a user to enter requests for approval to perform services on real property. The form 300 includes pull-down menus 305 for selecting services for which approval is requested. As shown in FIG. 4, when a user selects a pull-down feature 405 of the menu 305, a scrollable list 410 of possible services is displayed on the user interface. The user can select particular services from the list 410. For each service identified in the pull-down menus 305, the form 300 also includes data entry fields associated with first and second bids (as indicated at 310), a quantity associated with the service (as indicated at 315), dimensions associated with the service (as indicated at 320), comments on the service (as indicated at 325), and an amount requested for the service (as indicated at 330).

An indication 335 of the data entry fields that need to be completed by the user for each service is displayed in the form 300. In the illustrated example, for a first requested service 305(1) (i.e., removing exterior debris), an indication 335(1) is displayed indicating that the user needs to enter a quantity (i.e., of debris to be removed), and another indication 335(2) is displayed indicating that the user needs to enter comments (i.e., describing the debris). A third indication 335(3) is displayed indicating that the user needs to enter a second bid. The indications 335 that are displayed for each service 305 are determined based on the type of service requested. In general, the user is required to enter at least one bid in the amount column 330, and thus, a separate indication to enter data in the amount column 330 is not necessary. Similarly, the quantity, dimension, and comment data, as applicable, is presumed to be the same for both bids, so entry of this data for the second bid is generally not required. The indication 335(3) that a second bid is required serves as an indication that the amount data entry field 330 corresponding to the second bid needs to be completed. The inclusion of data entry fields for which a data entry is not required can be used to submit optional information. In some implementations, however, indications 335 can also be used for the amount column 330 to indicate which amount data entry fields 330 should be completed. In other implementations, data entry fields for which no entry is necessary can be omitted.

In connection with a second requested service 305(2) (i.e., repairing damaged plumbing), an indication 335(4) is displayed indicating that the user needs to enter dimensions and another indication 335(5) is displayed indicating that the user needs to enter comments. For the second requested service, however, a second bid is not necessary. Accordingly, the form 300 does not include an indication 335 of a second bid associated with the second requested service 305(2).

In some implementations, a user can view an explanation of the data to be entered into each required data entry field. The explanation for a particular data entry field can be displayed in a pop-up window by, for example, positioning a pointing device over the indication 335 associated with the particular data entry field or by double-clicking on the indication 335 or the data entry field itself. The explanation can include a more detailed description of the type of data that is required, such as by describing the units (cubic yards, square footage, feet, inches, yards, number of items, etc) in which the quantity or dimensions are to be expressed or describing, in the comments field, the type of damage, type of object, location, height, and the like of the objects on which the service is to be performed. The explanation can be helpful for users that are unfamiliar with the exact requirements and/or in cases where different services require different types of information in the dimension, quantity, or comments fields.

In some implementations, once a user has entered data in the required data entry fields and/or saved the form 300, an add attachment icon (not shown) can be displayed adjacent to each bid row for each service 305. The add attachment icon can be used to browse available electronic files and select files to associate with the entered bid data. For example, the user may attach an electronic copy of a contractor's bid document and/or photographs of parts of the real property to be repaired. In other implementations, the add attachment icon may be displayed, without entering data and/or saving the form 300, instead of or in addition to a separate indication that one or more bids are required.

As shown in FIGS. 3B and 3C, which depict a continuation of the form 300 shown in FIG. 3A, the form 300 can include a section 340 for summarizing services approved in a prior request and a section 345 for describing services for which costs have already been incurred (e.g., for services that are pre-approved and/or within a predetermined allowable limit). The form 300 can also include a section 350 for use by a reviewing entity (e.g., an M&M contractor) for providing feedback to the user after the form is submitted and reviewed. Generally, the portions of the form 300 reserved for use by the reviewing entity are unavailable for data entry by the user and can be shown in gray or omitted from the display of the requesting user.

As shown in FIG. 3A, the form 300 includes "submit for review" checkbox 355 and a save button 360. By selecting the "submit for review" checkbox 355 and then the save button 360, the user can submit the form to the reviewing entity. Typically, the ability to submit the form 300 is not an available option until all of the required data entry fields have been completed. In other implementations, however, the user may be able to submit the form 300 without including one or more required second bids. Instead, the user can subsequently retrieve a saved form 300, even if it has been submitted for review, to add a second bid.

FIG. 5 depicts an example of a form 500, which can be displayed on a user interface, for displaying a response to requests for approval to perform services on real property. The form 500 corresponds to a previously submitted form for requesting approval to perform services. The form 500 includes a section 505 for summarizing the services identified, and the corresponding data submitted, in the previously submitted form. In addition, the section 505 includes an approval column 510, in which a user associated with the reviewing entity indicates whether the requested service was approved, and an approved cost column, in which the user indicates the amount approved for the requested service. In some instances, the approved cost may be less than the amount requested. As depicted in the approval column 510 of FIG. 5, some requested services can be approved while others are not.

The form 500 also includes a section 520 for summarizing expenses already incurred, a section 525 for any general comments submitted by the requesting user in the original request, and a section 530 for the reviewing user to provide feedback (e.g., whether the request was approved (at least in part), a denial reason, and comments in response to the request). The requesting user can use the form 500 to provide comments explaining why the requested service should be approved or modifying the request to address problems with the original request. Once the requesting user has made any desired changes, the form 500 can be resubmitted using a "resubmit request" link 535.

The described techniques can be implemented in digital electronic circuitry, integrated circuitry, or in computer hardware, firmware, software, or in combinations thereof. Apparatus for carrying out the techniques can be implemented in a software product (e.g., a computer program product) tangibly embodied in a machine-readable storage device for execution by a programmable processor; and processing operations can be performed by a programmable processor executing a program of instructions to perform the described functions by operating on input data and generating output. The techniques can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the techniques can be implemented on a computer system having a display device such as a monitor or LCD (liquid crystal display) screen for displaying information to the user and a keyboard and a pointing device such as a mouse or a trackball by which the user can provide input to the computer system or a system which enables input and presents information via voice, symbols, or other means such as a Braille input and output system. The computer system can be programmed to provide a graphical user interface through which computer programs interact with users. With new technologies such as voice input and output, it is not a requirement to have a visual display to implement the described techniques.

The invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As used herein, the term "machine-readable medium" refers to any computer program product, apparatus, and/or device used to provide machine instructions and/or data to a machine, including a machine-readable medium that receives machine instructions as a machine-readable signal. Examples of a machine-readable medium include a storage medium, a memory, and/or PLDs, FPGAs, ASICs, and the like.

A number of implementations have been described. Nevertheless, it will be understood that various modifications may be made. Accordingly, other implementations are within the scope of the following claims.

What is claimed is:

1. A method performed on a computer for submitting requests relating to management of real property, the method comprising:
   presenting, on a user interface of a computer, a form for receiving data from a first user, wherein the data relates to requests for real property management;
   receiving, from the first user, a selection of a service to be approved from a predefined list for each of the plurality of requests, wherein the first user indicates each selection to be approved using the form presented on the user interface before a first submission of the form;
   receiving, from the first user, at least one data item for each request;
   determining, by the computer, whether the first submission of the form is received;
   if the first submission is received:
      communicating the form to a host, wherein the form comprises a separate approval indicator for each request;
      receiving an approval of at least one, but fewer than all, of the plurality of requests from the host; and
      presenting, to the first user on the user interface of the computer, an indication of the approval and an indication of requests not approved.

2. The method of claim 1 further comprising:
   allowing the first user to modify the at least one data item for the services not approved; and
   allowing the first user to resubmit the form with the modified data items for the services not approved.

3. The method of claim 2 wherein allowing the first user to resubmit the form comprises using a user interface component for resubmitting the request.

4. The method of claim 1 further comprising using the data in the form to automatically complete a form to be printed, wherein the form to be printed is formatted according to a format specified by one of a governmental agency and an entity that owns the real property.

5. The method of claim 1 wherein each of the plurality of requests for approval comprises a request for approval of an extension.

6. The method of claim 5 further comprising:
   allowing the first user to modify the at least one data item for the extensions not approved; and
   allowing the first user to resubmit the form with the modified data items for the extensions not approved.

7. An article comprising a machine-readable medium storing instructions for causing one or more processors to perform operations comprising:
   presenting, on a user interface, a form for receiving data from a first user, wherein the data relates to requests for real property management;
   receiving, from the first user, a selection of a service to be approved from a predefined list for each of the plurality of requests, wherein the first user indicates each selection to be approved using the form presented on the user interface before a first submission of the form;
   receiving, from the first user, at least one data item for each request;
   determining whether the first submission of the form is received;
   if the first submission is received:
      communicating the form to a host, wherein the form comprises a separate approval indicator for each request;
      receiving an approval of at least one, but fewer than all, of the plurality of requests from the host; and
      presenting, to the first user, an indication of the approval and an indication of requests not approved.

8. The article of claim 7 wherein each of the plurality of requests for approval comprises a request for approval of an extension of time.

9. The article of claim 7 wherein the machine-readable medium storing instructions for causing one or more processors to perform further operations comprising:
   allowing the first user to modify the at least one data item for the requests not approved; and
   allowing the first user to resubmit the form with the modified data items for the requests not approved.

* * * * *

UNITED STATES PATENT AND TRADEMARK OFFICE
CERTIFICATE OF CORRECTION

| | |
|---|---|
| PATENT NO. | : 8,370,235 B1 |
| APPLICATION NO. | : 12/561417 |
| DATED | : February 5, 2013 |
| INVENTOR(S) | : Lydia Chase, Doug Bland and Lisa Barrentine |

It is certified that error appears in the above-identified patent and that said Letters Patent is hereby corrected as shown below:

On the Title Page Item (73) Assignee should read "HomeTelos, L.P.".

Signed and Sealed this
Sixth Day of May, 2014

Michelle K. Lee
*Deputy Director of the United States Patent and Trademark Office*